United States Patent
Hogg et al.

(10) Patent No.: US 7,529,708 B2
(45) Date of Patent: May 5, 2009

(54) SYSTEM AND METHOD FOR DETERMINING LATENT DEMAND FOR AT LEAST ONE OF A PLURALITY OF COMMODITIES

(75) Inventors: Tad Hogg, Mountain View, CA (US); Bernardo A. Huberman, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 688 days.

(21) Appl. No.: 11/185,167

(22) Filed: Jul. 20, 2005

(65) Prior Publication Data

US 2005/0256800 A1 Nov. 17, 2005

Related U.S. Application Data

(62) Division of application No. 09/732,595, filed on Dec. 8, 2000, now Pat. No. 7,146,334.

(51) Int. Cl.
G06Q 40/00 (2006.01)
(52) U.S. Cl. ............................................ 705/37; 705/35
(58) Field of Classification Search ................... 705/35, 705/36, 37, 38, 39
See application file for complete search history.

(56) References Cited

U.S. PATENT DOCUMENTS

| | | | |
|---|---|---|---|
| 5,826,244 A | 10/1998 | Huberman | |
| 5,895,453 A | 4/1999 | Cook | |
| 6,078,906 A | 6/2000 | Huberman | |
| 6,119,100 A * | 9/2000 | Walker et al. | 705/20 |
| 6,223,167 B1 * | 4/2001 | Alaia et al. | |
| 6,332,129 B1 * | 12/2001 | Walker et al. | 705/26 |
| 6,397,193 B1 * | 5/2002 | Walker et al. | 705/16 |
| 6,944,599 B1 | 9/2005 | Vogel et al. | |
| 7,130,807 B1 * | 10/2006 | Mikurak | |
| 7,330,826 B1 * | 2/2008 | Porat et al. | |
| 2002/0007318 A1 * | 1/2002 | Alnwick | |
| 2002/0065769 A1 * | 5/2002 | Irribaren et al. | |
| 2002/0072946 A1 * | 6/2002 | Richardson | |
| 2004/0014326 A1 * | 1/2004 | Din | |
| 2005/0108140 A1 * | 5/2005 | Motte et al. | |
| 2005/0119965 A1 * | 6/2005 | Kathwari et al. | |
| 2006/0029261 A1 * | 2/2006 | Hoffman et al. | |
| 2006/0178980 A1 * | 8/2006 | Goldberg et al. | |
| 2006/0184447 A1 * | 8/2006 | Nieboer et al. | |
| 2006/0271471 A1 * | 11/2006 | Alaia et al. | |

* cited by examiner

*Primary Examiner*—Alexander Kalinowski
*Assistant Examiner*—Bruce I Ebersman
(74) *Attorney, Agent, or Firm*—Patrick J. S. Inouye

(57) ABSTRACT

A system for determining latent demand for at least one of a plurality of commodities includes an offer analyzer and a commodity selector. The offer analyzer analyzes at least a plurality of initially unaccepted offers for each of the plurality of commodities. The commodity selector selects at least one of the plurality of commodities to offer for sale which satisfies at least one criteria based on the analysis by the offer analyzer.

10 Claims, 3 Drawing Sheets

| COMMODITIES | | A | B | C | AB | AC | BC | ABC |
|---|---|---|---|---|---|---|---|---|
| BIDS | BIDDER 1 | 1 | 2 | 6 | 3 | 9 | 6 | 10 |
| | 2 | 2 | 1 | 4 | 12 | 8 | 7 | 12 |
| | 3 | 1 | 2 | 3 | 3 | 7 | 6 | 10 |
| | 4 | 3 | 1 | 2 | 4 | 7 | 4 | 9 |
| AGGREGATE SUM OF BIDS | | 7 | 6 | 15 | 22 | 31 | 23 | 41 |
| AVERAGE (DIVIDE BY NUMBER OF BIDDERS) | | 1.75 | 1.5 | 3.75 | 5.5 | 7.75 | 5.75 | 10.25 |
| VALUE/NUMBER OF ITEMS | | 1.75 | 1.5 | 3.75 | 2.75 | 3.875 | 2.875 | 3.417 |

*FIG. 3*

SYSTEM AND METHOD FOR DETERMINING LATENT DEMAND FOR AT LEAST ONE OF A PLURALITY OF COMMODITIES

This application is a Divisional claiming benefit under 35 U.S.C. § 120 of U.S. patent application Ser. No. 09/732,595, filed Dec. 8, 2000, now U.S. Pat No. 7,146,334 which is herein incorporated by reference in its entirety.

FIELD OF THE INVENTION

The present invention relates to a system and method for determining latent demand for a commodity, i.e. a good, service, or combination of goods and/or services, based on prior offers or bids for the commodity.

BACKGROUND OF THE INVENTION

Potential sales volume and demand, as well as appropriate pricing policies, for different goods and services are difficult to determine. These determinations become even more difficult when different combinations of goods and/or services are bundled together for sale because buyers and/or sellers may value a combination or set of goods and/or services differently from the sum of their individual values. Attempts to survey the market for all possible combinations of goods and/or services to help with these determinations is prohibitively expensive. As a result, it is difficult for sellers to identify an appropriate good, service, or combination of goods and/or services to sell, at what price, and the expected demand.

One way to determine an appropriate price for a good, service, or combination of goods and/or services is through an auction. Typically, in an auction participants provide bid information about what they are willing to pay for a good, service, or combination of goods and/or services being auctioned by an auctioneer or auction system. In an auction, bid information is collected and is used to determine which participant's bid is finally accepted, typically the highest price bid. The participant whose bid is accepted and the party with the good, service, or combination of goods and/or services being bid on, then exchange the good, service, or combination of goods and/or services at the accepted price.

Accordingly, this auction mechanism effectively determines a price for one good, service, or combination of goods and/or services between a buyer and seller. Unfortunately, this mechanism makes use of only a very limited portion of the submitted bid information, e.g., the highest bid. The remaining portion of the bid information provided by the participants is simply discarded.

SUMMARY OF THE INVENTION

A method for determining latent demand for at least one of a plurality of commodities in accordance with one embodiment of the present invention includes analyzing at least a plurality of initially unaccepted offers for each of the plurality of commodities and then selecting at least one of the plurality of commodities to offer for sale which satisfies at least one criteria based on the analyzing.

A system for determining latent demand for at least one of a plurality of commodities in accordance with another embodiment of the present invention includes an offer analyzer and a commodity selector. The offer analyzer analyzes at least a plurality of initially unaccepted offers for each of the plurality of commodities. The commodity selector selects at least one of the plurality of commodities to offer for sale which satisfies at least one criteria based on the analysis by the offer analyzer.

A computer readable medium having stored thereon instructions for identifying latent demand for at least one of a plurality of commodities in accordance with another embodiment of the present invention includes instructions to be executed by a processor for analyzing at least a plurality of initially unaccepted offers for each of the plurality of commodities and selecting at least one of the plurality of commodities to offer for sale which satisfies at least one criteria based on the analyzing.

With the present invention, demand and potential sales volume, as well as an appropriate pricing policy, for a different good or service easily can be determined based on the unsuccessful bids or the offers for each of the goods and/or services. Additionally, the present invention is able to identify combinations of goods and/or services that are particularly highly valued. This is particularly beneficial because attempting to survey the market for all possible combinations of goods and/or services would be prohibitively expensive.

BRIEF DESCRIPTION OF THE DRAWINGS

FIG. 3 is a table illustrating one example of offers for a plurality of commodities.

DETAILED DESCRIPTION OF THE INVENTION

Figure 1:
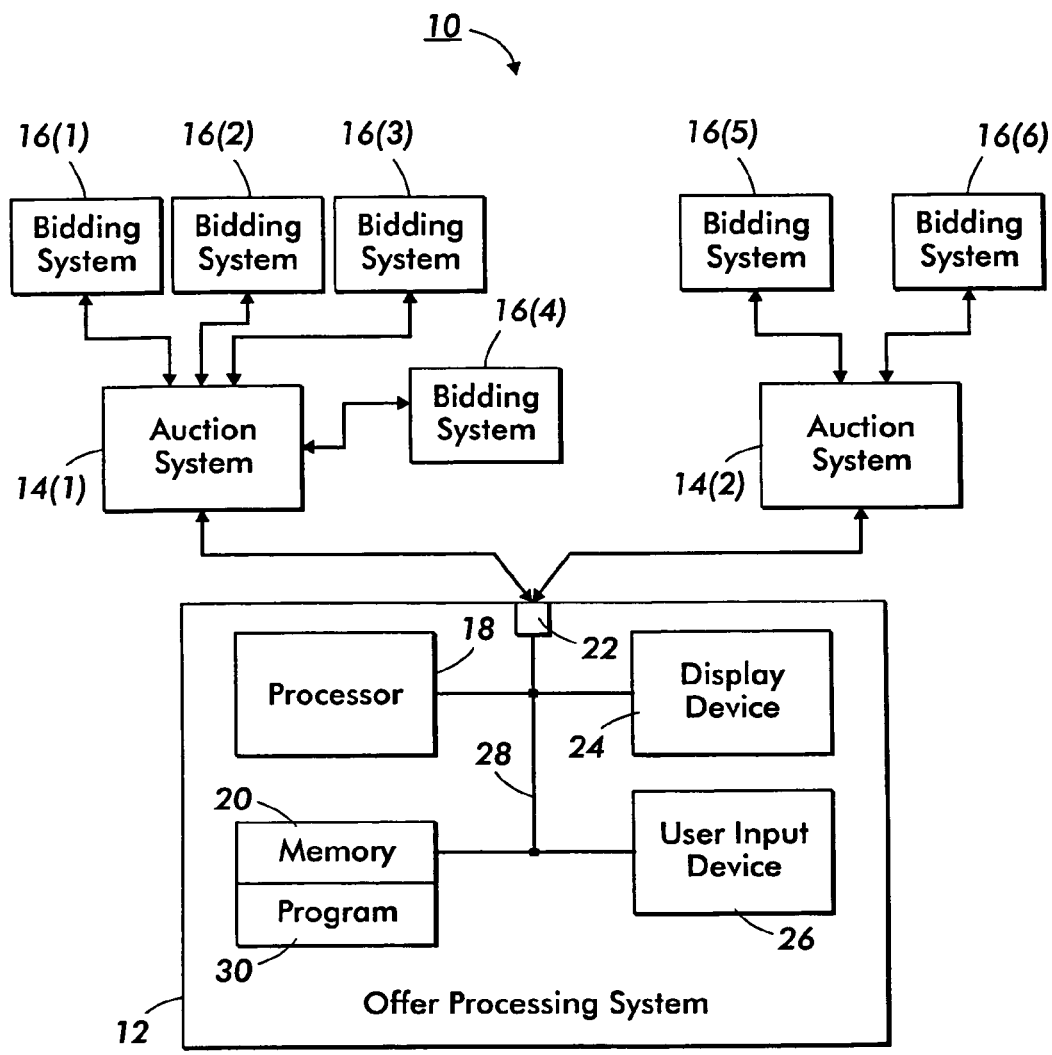
FIG. 1 is a diagram of a system for determining latent demand for at least one of a plurality of commodities.
Figure 2:
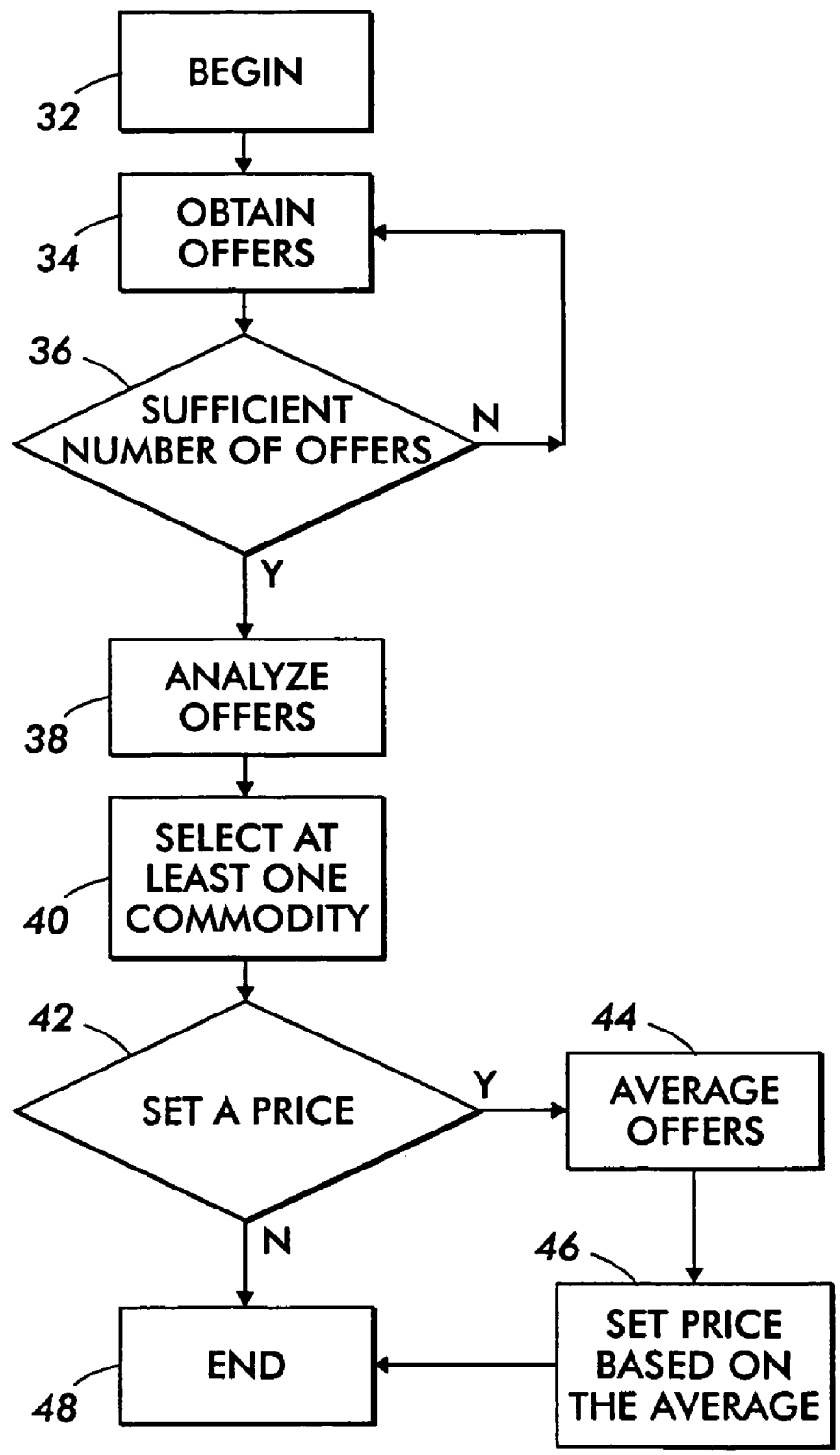
FIG. 2 is a flow chart of a method for determining latent demand for at least one of a plurality of commodities.

A system 10 and method for determining latent demand for at least one of a plurality of commodities in accordance with one embodiment of the present invention is illustrated in FIGS. 1 and 2. The system and method analyze at least a plurality of initially unaccepted offers for each of the plurality of commodities and then selects at least one of the plurality of commodities to offer for sale which satisfies at least one criteria based on the analysis. A commodity is a useful or valued good, service, or combination of goods and/or services. The present invention advantageously provides a system for identifying latent demand for a good, service, or combination goods and/or services.

Referring to FIG. 1, the system 10 includes an offer processing system 12, auction systems 14(1) and 14(2), and bidding systems 16(l)-16(6), although system 10 may have other numbers(n) of and/or different combinations of each of these systems 12(n), (14(n), 16(n), including a single system such as an offer processing system 12. The offer processing system is operatively coupled to the auction systems 14(1) and 14(2); auction systems 14(1) is operatively coupled to bidding systems 16(1)-16(4); and auction system 14(2) is operatively coupled to bidding systems 16(5) and 16(6). A variety of communication systems and/or methods can be used to operatively couple and communicate between the offer processing system 12 to each of the auction systems 14(1) and 14(2) and to operatively couple and communicate between the auction systems 14(1) and 14(2) to each of the bidding systems 16(1)-16(6) including a direct connection, a local area network, a wide area network, the world wide web, modems and phone lines, or wireless communication technology each having communications protocols. Although one configuration for the system 10 is shown, other configurations are possible and envisioned, such as operatively coupling the offer processing system 12 to other numbers of auctioning systems 14(*n*) or to none at all if the offer or bid information is input into or is otherwise already stored in one or more memory storage devices in the offer processing system 12.

The offer processing system 12 includes a processor 18, a memory storage device 20, and an input/output user interface 22, a display device 24, and a user input device 26 which are coupled together by a bus or other link 28, although the offer processing system 12 can be comprised of other combinations of components. The processor 18 executes a program 30 of stored instructions for the method for determining latent demand for at least one of a plurality of commodities in accordance with the present invention as described herein and set forth in FIG. 2. Although one processor 18 is shown, the offer processing system 12 can have multiple processors to execute the programmed instructions and the processor 18 or processors can be located elsewhere in the system 10, such as in one or more of the auction systems 14.

The memory storage device 20 stores at least one program 30 with instructions for the method for determining latent demand for at least one of a plurality of commodities for execution by the processor 18. A variety of different types of memory storage devices, such as a random access memory (RAM) or a read only memory (ROM) in the system or a floppy disk, hard disk, or CD ROM which is read from and/or written to by a magnetic or optical reading and/or writing system that is coupled to one or more of the processors, can be used to store these programmed instructions as well as other information. The offer processing system 12 can have multiple memory storage devices to store the programmed instructions. The memory storage devices as well as some or all of the programmed instructions can be located and stored elsewhere in the system 10, such as in one or more of the auction systems 14.

The input/output user interface 22 is used to operatively couple and communicate between the offer processing system 12 to the auction systems 14(1) and 14(2) as discussed earlier.

The display device 24 displays information for the operator, such as the commodity selected based on an analysis of prior offers. A variety of different types of display devices 24 can be used, such as a monitor, printer, or any other type of device which can convey information to the user of the computer system. Again, although only one display device 24 is shown, the system can have more than one display device 24 and the display device 24 can be located elsewhere in the system, such as in one or more of the auction systems 14.

The user input device 26 enables an operator to generate and transmit signals or commands to the offer processing system 12. A variety of different types of user input devices 26 can be used, such as a keyboard, computer mouse, or any other user input device which provides a mechanism for a user or operator. The offer processing system 12 can have more than one user input device 26 and the user input device 26 can be located elsewhere in the system, such as in one or more of the auction systems 14.

Each of the auction systems 14(1) and 14(2) is a computer system with a processor that executes programmed instructions stored in a memory used: to receive offers or bids from the bidding systems 16(1)-16(6) for different commodities; to transfer the information regarding the offers on the commodities to the offer processing system 12; and to notify the bidding system 16 with the winning offer or bid for a particular commodity, typically the highest bid. However, other types of systems and devices can be used for each of the auction systems 14 and each auction system 14 can be programmed with other instructions for execution by its processor, such as storing and/or processing the received bids. Each of the auction systems 14 may be operatively coupled to a plurality of bidding systems 16, although other configurations are possible. For example, each of the auction system 14 could be coupled to other sources of offers or bids which are input or otherwise stored in one or more memory storage devices in each of the auction systems 14.

Each of the bidding systems 16 is a computer system that executes programmed instructions to enable the operator of the bidding system to receive information about and to bid on one or more commodities, although other types of systems or devices could also be used for the bidding system 16, such as a user input device, like a keyboard or a mouse, coupled to the auction system. Each of the bidding systems 16 may be operatively coupled to one of the auction systems 14 in this particular embodiment, although other configurations are possible, such as having one or more of the bidding systems 16 operatively coupled to multiple auction systems 14 or to the offer processing system 12. A variety of different types computer systems can be used for the bidding systems 16, such as personal desktop computers, workstations, palm® computers, hand held computers, Internet ready cellular/digital mobile telephones, dumb terminals or any other larger or smaller computer system.

The operation of system 10 and method for determining latent demand for at least one of a plurality of commodities will be discussed with reference to FIGS. 1-3. At step 32, the method begins and then in step 34 offers for the commodities are obtained from auction system 14(1). In this particular auction, items A, B, and C, which each may be a good or a service, are offered individually and in various combination to form different commodities. The commodities are designated with the letters A, B, C, AB, AC, BC, and ABC, where the letter in the designation of the commodity represents the item or items in that particular commodity.

Auction systems 14(1) and/or 14(2) receive the bids or offers from one or more of the bidding systems 16(1)-16(6) for commodities and transmits the bids for each of the commodities to the offer processing system 12. The bids or offers are amounts that the bidders are willing to pay for the particular commodity being bid on. The auction systems 14(1) and 14(2) can transmit the bid information on each commodity in a variety of different ways, such as when the bids come in, after the auction is over, or when polled by the offer processing system 12. In this particular embodiment, both the accepted and the unaccepted bids or offers for the commodities are transmitted to the offer processing system 12 from the auction system 14(1), although other bid information could be sent, such as just the unaccepted bids for these commodities. In this particular example, the bids or offers submitted by the bidders 1, 2, 3, and 4 from bidding systems 16(1)-16(4) for the commodities A, B, C, AB, AC, BC, and ABC to auction system 14(1) are set forth in the table in FIG. 3.

In addition to transmitting the bids or offers, the auction systems 14(1) and/or 14(2) may also store the bids and eventually selects the winning bids from the bidding systems 16(1)-16(6), typically the highest bid or bids for the commodity or commodities. In this particular example, auction system 14(1) has notified bidder 1 from bidding system 16(1) that it has won commodity C with a high bid of six and has notified bidder 2 from bidding system 16(2) that it has won commodity AB with a bid of twelve.

Next, in step 36 the offer processing system 12 waits until it has received a sufficient number of offers or bids for the commodities. The number of offers or bids needed for each of the commodities can vary as needed or desired and can be set by the operator for the particular application using the user input device 26. If the offer processing system 12 has not received enough offers for the different commodities, then the No branch is taken from step 36 back to step 34 and the offer processing system 12 waits to receive or polls the auction system 14(1) and/or auction system 14(2) for more offers or bids on the commodities.

Although in this particular example, the bids or offers are obtained from bidding systems 16(1)-16(4) operatively coupled to one auction system 14(1), the offers can be obtained from multiple auctions conducted by one or more of the auction systems 14(n). Additionally, auctions on the same types of commodities do not need to take place at substantially the same time and the types of auctions conducted can vary. Further, the auction may be electronically automated and, for example, be conducted on the Internet, although the auction could be conducted using other forums and systems.

When a sufficient number of offers has been received, then the Yes branch is taken from step 36 and the offer processing system 12 begins to analyze the offers for each of the commodities by each of the bidders(n) in step 38. In this particular embodiment, the offer processing system 12 uses the accepted and the unaccepted offers in the analysis to identify a highly valued commodity, although the offer processing system 12 may use other portions of the bid information, such as just the unaccepted offers and may identify more than one highly valued commodity. The particular analysis conducted by the offer processing system 12 can vary based on the particular application. For example, one analysis which can be conducted to identify a highly valued commodity involves: determining a sum total of the offers for each of the plurality of commodities from the received unaccepted and accepted offers for each of the commodities; dividing each of the sum total offers by the total number of offers for each of the plurality of commodities to obtain an average offer for each of the plurality of commodities; and then dividing each of the average offers by the number of items, i.e. the number of goods and/or services, in each of the plurality commodities, to obtained an analyzed value for each of the plurality of commodities.

By way of example only, using this analysis: the total offer price for commodity A was 7, the total number of offers was 4, the average offer was 1.75, and the analyzed value for commodity A was 1.75; the total offer price for commodity B was 6, the total number of offers was 4, the average offer was 1.5, and the analyzed value for commodity B was 1.5; the total offer price for commodity C was 15, the total number of offers was 4, the average offer was 3.75, and the analyzed value for commodity C was 3.75; the total offer price for commodity AB was 22, the total number of offers was 4, the average offer was 5.5, and the analyzed value for commodity AB was 2.75; the total offer price for commodity AC was 31, the total number of offers was 4, the average offer was 7.75, and the analyzed value for commodity AC was 3.875; the total offer price for commodity BC was 23, the total number of offers was 4, the average offer was 5.75, and the analyzed value for commodity BC was 2.875; and the total offer price for commodity ABC was 41, the total number of offers was 4, the average offer was 10.25, and the analyzed value for commodity ABC was 3.417 as shown in the table in FIG. 3 Although one particular analysis is discussed, the offer processing system 12 can be programmed with instructions to be executed by the processor 18 to carry out other types of analyses for different applications.

Once the analysis is completed in step 38, then the offer processing system 12 selects the highly valued commodity based on at least one criteria in step 40. In this particular embodiment, the criteria is the highest numerical value for the analyzed value and in this particular example that is commodity AC with an analyzed value of 3.875 as shown in FIG. 3. The selected commodity or commodities based on the analysis can be shown on the output display device 24. As this example illustrates, the winning bids were for commodities AB and C which were sold, but the analysis shows that the commodity AC has the highest analyzed value demonstrating a latent demand for this particular commodity which was not sold. As a result, this particular commodity may now be offered for sale. Although in this particular embodiment, one criteria is used and the criteria is the highest numerical value, other numbers of criteria can be used and different criteria can be set by the operator as appropriate for the particular application using the user input device 26.

Next, the method may include the optional step of setting a price for the selected commodity in step 42. If a price is not going to be selected for the commodity, then the No branch is taken from step 42 to step 48 where this particular embodiment of the method ends. If a price for the commodity is to be selected, then the Yes branch is taken from step 42 to step 44 where the offers for the selected commodity are averaged. Next, in step 46 a price for the selected one of the commodities is determined based on the average offer determined in step 44.] Here, the selected price for the selected commodity is the average offer, although other prices for the commodity can be used. Once the price is set, then the branch is taken from step 46 to step 48 where the method in this particular embodiment ends.

Accordingly, the present invention is able to identify a commodity or commodities, in particular a combination of goods and/or services, that are highly valued based on an analysis of at least the unaccepted bid information, and typically all of the bid information, e.g. the accepted and unaccepted bid information. The present invention is also useful in identifying potential demand and sales volumes, as well as pricing, for a commodity based on this previously unused bid information.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A computer-implemented method for identifying latent demand for commodities, the method comprising:

storing on a computer a plurality of accepted and unaccepted offers for commodities following an online auction, wherein the commodities were offered through bids submitted during the online auction and the accepted and unaccepted offers comprise the bids;

identifying by the computer an average offer for the commodities from the accepted and unaccepted offers;

dividing by the computer each average offer by a total number of items in each of the commodities;

designating by the computer a quotient as an analyzed value for each of the commodities;

defining by the computer an offer criteria comprising the analyzed value having a highest numerical value;

identifying by the computer the accepted and unaccepted offers that satisfy the offer criteria;

selecting by the computer the commodities corresponding to the identified accepted and unaccepted offers;

setting by the computer prices for each of the selected commodities, wherein each of the prices comprises the average offer for the commodities from the accepted and unaccepted offers; and electronically displaying on a display the names of the selected commodities and the highest calculated prices of their accepted and unaccepted offers.

2. The method as set forth in claim 1 wherein at least one of the commodities is a combination of two or more items.

3. The method as set forth in claim 1 further comprising obtaining by the computer the accepted and unaccepted offers for the commodities from at least one external source.

4. A system for identifying latent demand for commodities, the system comprising:

a database configured to store a plurality of accepted and unaccepted offers for commodities following an online auction, wherein the commodities were offered through bids submitted during an the online auction and the accepted and unaccepted offers comprise the bids;

a processor comprising:

determination logic programmed to identify an average offer for the commodities from the accepted and unaccepted offers;

division logic programmed to divide each average offer by a total number of items in each of the commodities and to designate a quotient as an analyzed value for each of the commodities;

criteria logic programmed to define an offer criteria comprising the analyzed value having a highest numerical value; analysis logic programmed to identify the accepted and unaccepted offers that satisfy the offer criteria; and selection logic programmed to select the commodities corresponding to the identified accepted and unaccepted offers;

pricing logic programmed to set by the computer prices for each of the selected commodities, wherein each of the prices comprises the average offer for the commodities from the accepted and unaccepted offers; and a display configured to electronically display the names of the selected commodities and their highest calculated prices of their accepted and unaccepted offers.

5. The system as set forth in claim 4 wherein at least one of the commodities selected by the commodity selector is a combination of two or more items.

6. The system as set forth in claim 4 further comprising an interface module configured to obtain the accepted and unaccepted offers for the commodities from at least one external source.

7. A computer readable medium storing code for identifying latent demand for commodities, comprising:

computer-executed code for storing a plurality of accepted and unaccepted offers for commodities following an online auction, wherein the commodities were offered through bids submitted during the online auction and the accepted and unaccepted offers comprise the bids;

computer-executed code for determining an average offer for the commodities from the accepted and unaccepted offers;

computer-executed code for dividing each average offer by a total number of items in each of the commodities;

computer-executed code for designating a quotient as an analyzed value for each of the commodities;

code for specifying a latent demand for at least one of the commodities, computer-executed code for defining an offer criteria comprising the analyzed value having a highest numerical value;

computer-executed code for identifying the accepted and unaccepted offers that satisfy the offer criteria;

computer-executed code for selecting the commodities corresponding to the identified accepted and unaccepted offers;

computer-executed code for setting by the computer prices for each of the selected commodities, wherein each of the prices comprises the average offer for the commodities from the accepted and unaccepted offers; and computer-executed code for displaying on a display the names of the selected commodities using each of and their highest calculated prices of their accepted and unaccepted offers.

8. The storage medium as set forth in claim 7 wherein at least one of the commodities is a combination of two or more items.

9. The storage medium as set forth in claim 7 further comprising computer-executed code for obtaining the accepted and unaccepted offers for the commodities from at least one external source.

10. A computer-implemented method for pricing a commodity based on latent demand, comprising:

storing on a computer a plurality of electronic offers for commodities following automated sales, wherein the commodities were offered for sale during the automated sales over an automated sales system;

determining by the computer an average offer for the commodities from the electronic offers;

dividing by the computer each average offer by a total number of items in each of the commodities;

designating by the computer a quotient as an analyzed value for each of the commodities;

analyzing by the computer each of the electronic offers against an offer criteria comprising the analyzed value having a highest numerical value and selecting by the computer one of the commodities corresponding to those electronic offers that satisfy the offer criteria as reflecting a latent demand for the selected commodity;

setting by the computer prices for each of the selected commodities, wherein each of the prices comprises the average offer for the commodities; and establishing by the computer a commodity valuation from the electronic offers for the selected commodity and electronically displaying the name of the commodity and an offering price based on the calculated commodity valuation.

* * * * *